United States Patent
Hinzpeter

(10) Patent No.: US 9,061,445 B2
(45) Date of Patent: Jun. 23, 2015

(54) FORMING TOOL

(75) Inventor: Udo Hinzpeter, Menden (DE)

(73) Assignee: ROCTOOL, Le Bourget Du Lac (FR)

( * ) Notice: Subject to any disclaimer, the term of this patent is extended or adjusted under 35 U.S.C. 154(b) by 435 days.

(21) Appl. No.: 13/255,578

(22) PCT Filed: Mar. 10, 2010

(86) PCT No.: PCT/IB2010/051033
§ 371 (c)(1),
(2), (4) Date: Nov. 7, 2011

(87) PCT Pub. No.: WO2010/103471
PCT Pub. Date: Sep. 16, 2010

(65) Prior Publication Data
US 2012/0070526 A1 Mar. 22, 2012

(30) Foreign Application Priority Data
Mar. 11, 2009 (DE) .................... 20 2009 001 959 U

(51) Int. Cl.
*B29C 33/06* (2006.01)
*B29C 45/73* (2006.01)
*B29C 35/08* (2006.01)

(52) U.S. Cl.
CPC ............. *B29C 33/06* (2013.01); *B29C 45/7312* (2013.01); *B29C 2035/0811* (2013.01)

(58) Field of Classification Search
CPC ................ B29C 33/06; B29C 45/7312; B29C 2035/0811
See application file for complete search history.

(56) References Cited

U.S. PATENT DOCUMENTS

| 4,439,492 A | 3/1984 | Wada et al. |
| 4,563,145 A | 1/1986 | De Meij |
| 2006/0152321 A1* | 7/2006 | Jung et al. ...................... 336/200 |
| 2008/0053985 A1* | 3/2008 | Kagan et al. ................... 219/644 |
| 2008/0303194 A1* | 12/2008 | Anbarasu et al. .............. 264/403 |
| 2010/0201040 A1* | 8/2010 | Guichard et al. ............. 264/403 |

FOREIGN PATENT DOCUMENTS

| DE | 90 12 186 | 10/1990 |
| DE | 199 29 731 | 1/2001 |
| DE | 102 57 129 | 6/2004 |
| DE | 20 2006 020117 | 12/2007 |
| EP | 0 335 100 | 10/1989 |

(Continued)

OTHER PUBLICATIONS

Kim, JJ; Cha, SH. "Optimized surface treatment of Indium Tin Oxide (ITO) for Copper Electroless Plating". Jpn. J. Appl. Phys. V41, p. 1269-1271, Nov. 2002.*

(Continued)

*Primary Examiner* — Alison Hindenlang
(74) *Attorney, Agent, or Firm* — Young & Thompson

(57) ABSTRACT

A forming tool, advantageously made from a metal with a forming contact surface (4, 5) and with one or several temperature regulation canals ($T_1$) which are integrated in the tool (2, 2.1) and through which a fluid flows, characterized in that an electric conductor in the form of an inductor (9) is arranged at the internal wall of the temperature regulation canals ($T_1$) and, if need be, with the insertion of a dielectric layer covering the temperature regulation canals ($T_1$).

14 Claims, 1 Drawing Sheet

(56) References Cited

FOREIGN PATENT DOCUMENTS

Figure 1:
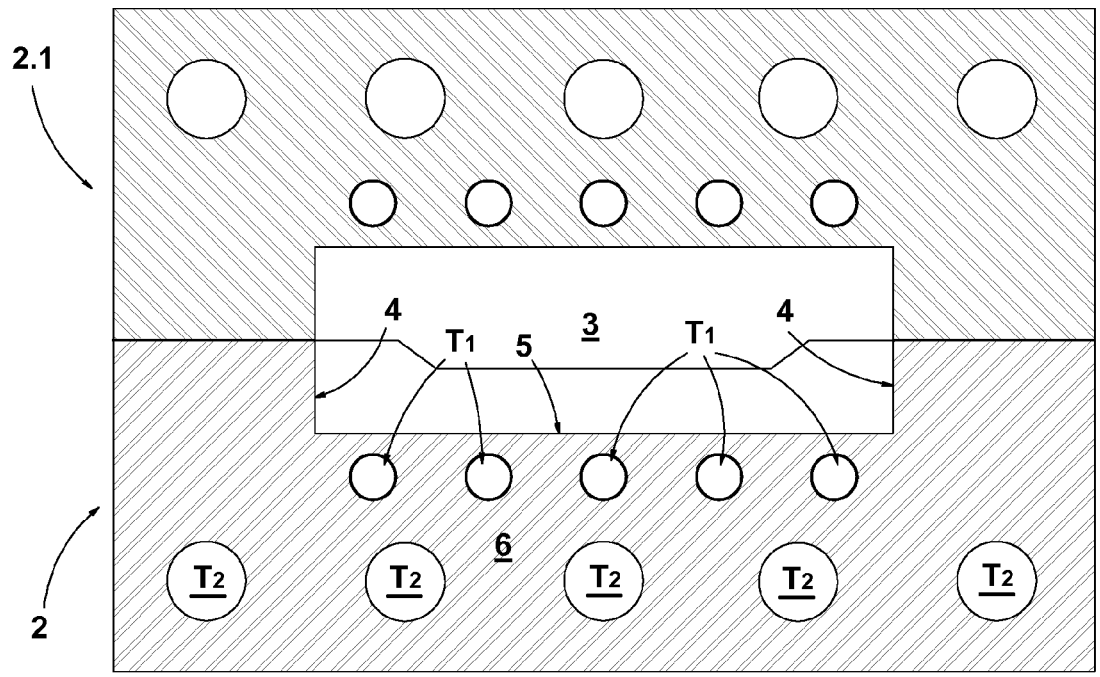

| EP | 1 110 692 | 6/2001 |
|----|-----------|--------|
| EP | 1 318 002 | 6/2003 |
| GB | 2 007 579 | 5/1979 |
| JP | 6 218784 | 8/1994 |
| WO | WO 2006136743 A1 * | 12/2006 |

OTHER PUBLICATIONS

Zinn, S; Semiatin, SL. "Coil Design and Fabrication Tech Note: Fabrication Principles", originally published in Heat Treating Magazine, Jun. 1988, accessed Jun. 19, 2014 at http://www.stanleyzinn.com/induction-heating/coil-design-3.html 6/.*

International Search Report dated Oct. 7, 2010, corresponding to the PCT application.

* cited by examiner

FORMING TOOL

BACKGROUND OF THE INVENTION

1. Field of the Invention

The invention relates to a forming tool, advantageously made from a metal with a forming contact surface and with one or several canals which are integrated in the tool and through which a fluid flows.

2. Description of the Related Art

When parts are moulded by injection from thermoplastic, duroplastic or elastomeric materials, the material, which has been plasticized beforehand, is introduced into the cavity of a mould. For making up the cavity, such a mould is composed of several forming tools which are separated from each other in order to remove the part cooled in the cavity. The surfaces of the forming tools, which are in contact with the moulding plastic material, are called contact surfaces within the context of these realisations. The image of these contact surfaces defines the surface of the part. The moulding precision of the part surface can be spoiled by defaults, for example by glued joint grooves, brightness differences or mottling and mark formation. Such surface defaults can be generated by irregular contact surface differences for the forming tools.

For improving the moulding precision for the plasticized material introduced into the cavity of a mould, for example a fused plastic material, it is known to increase the tool wall temperature, thus the temperature of the contact surfaces of the forming tools, so that the flowability of the fused plastic material introduced into the cavity is improved at its edge region.

For regulating the temperature of such forming tools, these comprise temperature regulation canals through which fluids, regulated at an appropriate temperature, for example water or oil, flow in order to maintain the forming tool at a determined temperature or to heat it up to a determined temperature. If such forming tools must have in determined regions a higher temperature, different from the basic temperature, electric heating cartridges or electric cooling elements, for reducing the temperature locally, are further arranged in recesses in the forming tool. Forming tools are also known in which the cooling elements are used for performing a definite cooling of the fused plastic material and thus for reducing the cooling process, therefore the cycle time.

In DE 199 29 731 A1 it is described a forming tool which can be subjected to an induction heating for introducing heat into the cavity and which is made, for this purpose, from an electrically conductive material. In U.S. Pat. No. 4,439,492 it is described a forming tool in which inductive heating inserts for heating the contact surfaces are inserted into the cavity. After heating the contact surfaces of the forming tools, the mould is opened and the heating insert is removed before closing again the mould in order to perform then the injection moulding process as such. The design of this forming tool is based on the idea that the insertion of inductive heating inserts enables to heat not all the forming tool but only the contact surfaces and the forming tool regions close to them. In this manner, the cycle times can be reduced. A control of the temperature regulation during the injection moulding process is not possible with this design.

These already known means enable to heat forming tools. The cycle times during the injection moulding are decisively determined for hardening the material introduced in a plasticized state into the mould cavity. For reducing the cycle times, forming tools have been developed in which it is provided, as well as the temperature regulation canals for heating the forming tool, additional temperature regulation canals through which a cooling agent can flow. Such a forming tool can thus be heated and cooled. The inconvenient of such a conception of a forming tool is however its relative inertial behaviour. In order to eliminate this inconvenient, it is proposed in DE 102 57 129 to heat the contact surfaces of a forming tool, i.e. it is proposed that the inductor used for heating the first contact surface is integrated in a first forming tool which is placed opposite the contact surface to be heated of a second forming tool. Thus, in this already known forming tool, the inductor is separated by the cavity from the contact surface to be heated. In order to be able to heat a contact surface in this manner, it is necessary that the contact surface to be heated of the forming tool is made from an appropriate material. In most cases, this material differs from the material of the other forming tools used for forming the cavity. For surface defaults not to appear at the transition between the material necessary for the heating process and the contact surface material of other cavity limitations these transitions must be very carefully realised or the entire surface around the cavity is made from this material. Moreover, the method described in this document can only be used with determined tool geometries.

SUMMARY OF THE INVENTION

From the discussed state of the art, the object of the invention is to improve an above-mentioned forming tool so that, by using such a forming tool or when using a mould composed of such forming tools, it is possible not only to have a sufficient representation of the contact surface on the part to be moulded but to reduce the cycle times. Moreover, it would be desirable not to limit these advantages to determined forming processes and/or a determined arrangement of forming tools.

According to the invention, this object is achieved by an above-mentioned generic forming tool in which an electric conductor in the form of an inductor is arranged at the internal wall of the temperature regulation canals and, if need be, with the insertion of a dielectric layer covering the temperature regulation canals.

In the case of this forming tool the temperature regulation canals, typically integrated in the forming tool, is used for regulating the temperature of the tool to its basic temperature. Moreover, the electric conductor in the form of an inductor is used for performing an inductive heating of at least one contact surface of the forming tool. For this purpose, the internal walls of the forming tool, typically made from steel, is covered with a dielectric layer. The dielectric layer in the form of an insulator is used for insulating an inductor, arranged inside the temperature regulation canals, from the material of the forming tool which typically has electrically conductive properties, for example if it is made from tool steel. An electric conductor in the form of an inductor, typically a copper conductor, is arranged on the dielectric layer, for example in the form of a layer deposited on the insulator. The temperature regulation canals can be used with a forming tool having such a design for conveying a cooling agent, whereas the forming tool is heated by the integrated inductors for heating the contact surface. The cooling agent can have for example a temperature which must correspond to the basic temperature of the forming tool and which is thus cooler than the fused material introduced into the cavity when using the forming tool, so that the cooling process can be reduced. As forming tools are submitted to appreciable static stresses and, in the case of this moulded part, the same temperature regulation canals are used for heating as well as cooling a contact surface, these canals can be arranged at a relatively short distance from the contact surface. As a more important quantity of heat can be introduced into the forming tool by the inductor in a shorter time, this forming tool can be heated more quickly. When using an inductor for the heating process, the temperature regulation liquid flowing through the temperature regulation canals ensures that the inductor is not excessively heated. The possibly to provide the heat supply as well as the heat dissipation in the vicinity of the contact surface is advantageous in that the contact surface can be heated in a shorter time and also cooled relatively more quickly, while reduces consequently the cycle times.

The inductor arranged in such a temperature regulation canal is advantageously conformed as an annular conductor. The inductor can be conformed for example so that the temperature regulation canals are covered in a first step, for example by means of a Sol-Gel method, with an electric insulating layer, the dielectric layer. The typical layer thickness is about a few μm. In a second step, for example also by means of a Sol-Gel method, the dielectric layer is provided thereon with a layer having some electric conductivity. This layer is not the inductor yet. This layer is only used to form thereon the inductor by means of a galvanic deposition method. This method is implemented only when the material to be deposited on the electric conductive inductor material, for example copper, has some electric conductivity. Then, the inductor is advantageously deposited on this layer by means of a galvanic deposition method. Such a method enables to get more important layer thicknesses. When the dielectric layer and the intermediate layer, also deposited by means of a Sol-Gel method, have each a thickness of a few μm, the layer forming the inductor can be much thicker, for example have a thickness of 0-15 mm. The inductor layer needs to have some thickness for the current intensity necessary for the inductor operation to be able to flow therethrough. The described conformation of the inductor has for inherent consequence a good heat transfer between the inductor layer and the forming tool. This is due to the small layer thickness of the dielectric layer and the electrolytic basic layer used in the previously described embodiment example and to the fact that no inclusion of air are provided between the layers.

It is clear from the conformation of thus-designed inductors that the free traversable cross-section is hardly reduced by temperature regulation canals in a forming tool so that forming tools can be improved by providing their temperature regulation canals with such an inductor in an appropriate manner.

In a preferred embodiment, the forming tool includes first temperature regulation canals, which are arranged just near at least one of its contact surfaces and which are conformed as described before and thus comprise an inductor, as well as second temperature regulation canals placed at a longer distance from the contact surface. In such an embodiment, the second temperature regulation canals are typically used to maintain the forming tool at its basic temperature. These first temperature regulation canals enable, if needed, to increase or reduce the temperature from the basic temperature adjusted by the second temperature regulation canals. Thus, the temperature variations enable to regularly submit only a relatively small volume of the forming tool to the temperature variation, the temperature variations beginning from the temperature level adjusted by the second temperature regulation canals. Consequently, the reaction time for varying the temperature on the contact surface of the forming tool is correspondingly short.

BRIEF DESCRIPTION OF THE DRAWING FIGURES

Figure 2:
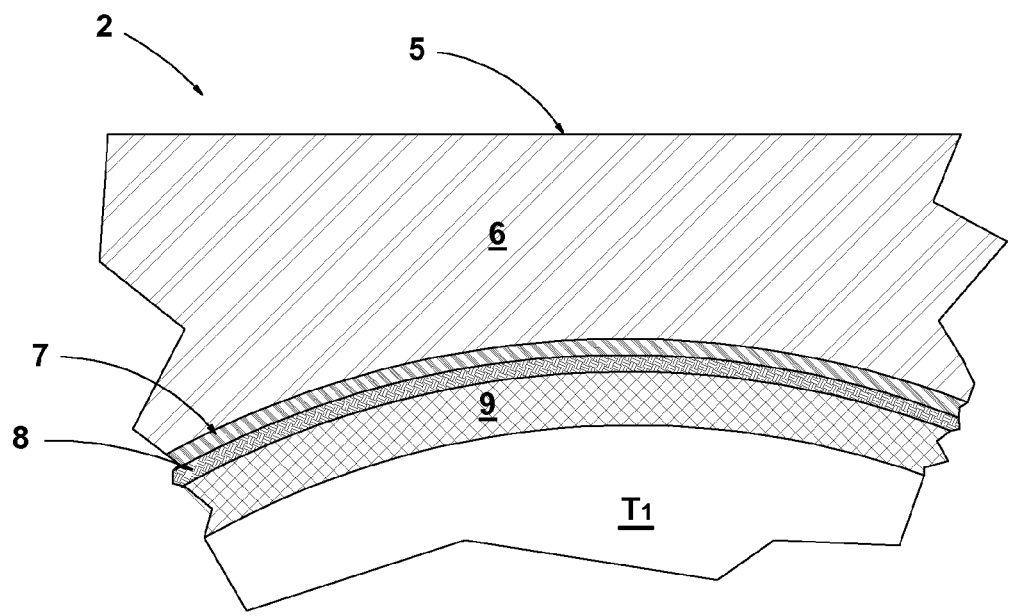

The invention will described afterwards by referring to an embodiment example and the annexed figures in which FIG. 1 is a schematic cross-sectional representation of an injection mould composed of two moulding tools, and FIG. 2 is an enlarged representation of the region of enveloping surface of a first temperature regulation canals.

DETAILED DESCRIPTION OF THE INVENTION

An injection mould 1 of a plastic material injection moulding tool, not represented otherwise in details, comprises in the represented embodiment example two forming tools 2, 2.1, which injection mould is represented in FIG. 1 in its closed position. A cavity 3, in which a plasticized plastic material is introduced through injection canals, not represented in details, is formed by both forming tools 2, 2.1. For simplicity reasons, the cavity 3 of the embodiment example in the sectional representation is designed with a rectangular shape. It must be understood that the geometry of the cavity 3 can finally have any shape and that, if the cavity has a complex geometry, more than two forming tools is necessary. The forming tools 2, 2.1 have basically the same design. The forming tool 2 is described in details subsequently.

The forming tool 2 is made from tool steel. The cavity limiting surface potions of the mould 2 are contact surfaces on which the fused plastic material introduced into the cavity 3 presses for reproducing the contact surfaces. In the represented embodiment example, the individual contact surfaces of the forming tool 2 have a various importance. Consequently, the contact surfaces, which extend vertically in FIG. 1, are characterised with the reference number 5. The difference between the contact surfaces 4, 5 is that, for reproducing the contact surface 5, the part to be made must meet particularly high requirements concerning the optical appearance of this part surface. Several first temperature regulation canals, which are arranged at a distance from each other, are arranged at a distance of a few millimeters, for example 5-8 mm, from the contact surfaces 4, 5. In this represented embodiment example, the temperature regulation canals have a diameter of about 8 mm. The first temperature regulation canals $T_1$, represented in a cross-sectional view in FIG. 1, are in the form of meanders which are in fluidic communication one with the other and thus form a known serpentine circuit of temperature regulation canals. In the forming tool 2, second temperature regulation canals $T_2$ are integrated at a higher distance from the contact surface 5. In the represented embodiment example, these canals have a diameter of about 12 mm. Also, in a known manner, the second temperature regulation canals $T_2$ are connected one with the other for forming a serpentine circuit of temperature regulation canals.

An inductor, notably for heating the contact surface 5, is integrated in the first temperature regulation canals $T_1$. The inductor integrated in the first temperature regulation canals $T_1$ are a copper conductor deposited on the internal wall of the temperature regulation canals $T_1$. FIG. 2 represents the structure of the wall of a first temperature regulation canal $T_1$ in a much enlarged representation. In this structure, the body of the forming tool 2 is characterised with the reference number 6. A dielectric layer 7 is deposited on the internal wall of the temperature regulation canals $T_1$, integrated in the forming tool 2, for forming an electric insulator. The dielectric layer can be for example a layer of silicon oxide deposited by means of a Sol-Gel method. The dielectric layer 7 is used to have an insulator between the electric conductor used as an inductor and the steel body 6 of the forming tool 2 which is also electrically conductive because of its material property. In another step, a thin, electrically conductive layer, deposited for example by means of Sol-Gel method, is arranged on the dielectric layer 7. This layer can be for example a so-called ITO layer (Indium-Tin oxide layer). The electric conductibility of this layer is necessary for being able to deposit thereon an electrically conductive layer, advantageously a copper layer, by means of a galvanic deposition or transfer method. A copper layer, which has been deposited on the thin layer by means of such a method, forms as a conductive layer the inductor 9 respectively the inductor layer. Whereas both layers 7, 8 have each a thickness of only a few μm, the inductor layer has a thickness of about 0.2 mm. In FIG. 2 the layer thicknesses are not in a scale representation.

The wall structure, described in FIG. 2, of a first temperature regulation canals $T_1$ extends over the entire dimension of the first temperature regulation canals $T_1$, which is already a requirement in the described method. On the contrary, if the first temperature regulation canals $T_1$ are placed partially or entirely in a part of the forming tool, which is fundamentally possible, it is sufficient that only the temperature regulation canal portion of the half forming tool having the contact surface comprises an inductor with such a conception.

The temperature regulation canals $T_1$, $T_2$ are each connected, in a manner not represented in details in the figures, to a different temperature regulation unit for conveying a temperature regulation fluid. The inductor 9 is connected to a current supply unit for supplying the current, necessary for operating an inductor, to the inductor 9. The current supply unit as well as the temperature regulation units is connected to a control unit for controlling the injection process to be implemented with the injection mould 1.

The forming tools 2, 2.1 are adjusted to their basic temperature desired for performing the respective injection moulding process by means of the second temperature regulation canals $T_2$. The basic temperature depends on the injection moulding process to be performed. This temperature is for example of 80° C. The first temperature regulation canals $T_1$ are used to regulate the temperature of the contact surfaces 5 to a temperature deviating from the selected basic temperature. The arrangement of the temperature regulation canals $T_1$ at a small distance from the contact surface 5 has positive consequences on a short heating time so that the contact surface 5 can be heated very quickly up to the temperature above the basic temperature of the forming tool 2. This heating process enables to heat the contact surfaces 4 at the same time. The forming tool 2 can also be exploited for heating the contact surfaces 4, 5 so that a temperature regulation fluid, which has a temperature above the basic temperature of the forming tool 2, 2.1, can flow through the first temperature regulation canals $T_1$. In such an operation mode, short-time temperature peaks can be generated on the contact surfaces 4, 5 by the operating inductor 9. The first temperature regulation canals $T_1$ can also be used by supplying them with a temperature regulation fluid the temperature of which is under the desired basic temperature of the forming tool 2. In such an embodiment the contact surfaces 4, 5 can be actively heated by means of an inductor and also actively cooled by stopping the inductor and supplying the temperature regulation canals $T_1$ with a correspondingly cooler temperature regulation fluid, which also reduces the cycle time. The cycle time reduction is further obtained by the fact that, in a conception as represented in the figures, the forming tool 2 has a determined basic temperature introduced by the fluid flowing through the second temperature regulation canals $T_2$, and a heating process is then performed from the basic temperature and not from the ambient temperature. It is clear from the preceding description that, in the represented embodiment example, the first temperature regulation canals $T_1$ heat and cool not the entire forming tool 2 but only the edge region of the forming tool 2 which is adjacent to the contact surfaces 4, 5.

The invention has been described in the figures by referring to an embodiment example. It is also possible to associate the first temperature regulation canals, containing the inductor, only to individual contact surface regions of a forming tool. It is also possible to divide the first temperature regulation canals into two or more temperature regulation circuits so that different contact surfaces or contact surface regions of a forming tool can thus be heated or cooled independently. Instead of using first and second temperature regulation canals, as described in the embodiment example, a forming tool can also comprise only first temperature regulation canals in order to use some advantages of the invention.

It is particularly appropriate to have the before-described possibility to form the inductor so that it can be integrated into existing temperature regulation canals by means of chemical or electrochemical fixation or deposition processes. In this manner, inductors can also be formed in temperature regulation canals of forming tools which have a complex geometry.

The formation of the layer supporting the inductor as well as the formation of the inductor layer itself has been described before as an example. Other deposition or fixation methods as well as other materials can also be used for forming the layers. For example, the dielectric layer can also be generated by means of an epoxy resin, a lacquer or by washing the temperature regulation canals, integrated in the steel material, with a washing cement which generates on the steel surface an oxide layer which can be used as an electric insulator because of its dielectric properties. It is clear from the description that the thin, electrically conductive layer, deposited in the embodiment example, is only used for deposit the inductor layer by means of a galvanic process. If this is not necessary when using part material which is not electrically conductive, it is not useful to provide such an intermediate layer.

The covering of the temperature regulation canals when forming the inductor enables to protect at the same time the temperature regulation canals against corrosion.

Many other developments will appear to the man skilled in the art for embodying the invention within the frame of the claims without any detailed exposition.

LIST OF THE REFERENCES

1 Injection mould
2, 2.1 Forming tool
3 Cavity
4 Contact surface
5 Contact surface
6 Body of the forming tool
7 Dielectric layer
8 Thin, electrically conductive layer
9 Inductor
$T_1$ First temperature regulation canal
$T_2$ Second temperature regulation canal

The invention claimed is:
1. A forming tool, made from an electrically conductive metal with a forming contact surface comprising:
 a first temperature regulation canal which is integrated in the tool at a closest distance from the contact surface and through which a fluid flows;

a second temperature regulation canal through which a fluid flows and which is arranged at a longer distance from the contact surface opposite the first temperature regulation canal; and an internal wall of the first temperature regulation canal comprising a dielectric first layer deposited on a wall of the first temperature regulation canal, an electrically conductive second layer deposited on the dielectric layer and a third layer made of an electrically conductive material, the third layer being an inductor layer having a thickness of about 0.2 mm.

2. The forming tool according to claim 1, wherein the inductor layer is conformed as an annular conductor.

3. The forming tool according to claim 1, wherein the dielectric first layer is realised as a micro- or nano-covering.

4. The forming tool according to claim 1, wherein the electrically conductive second layer, realised as micro- or nano-covering, is made of indium tin oxide (ITO).

5. The forming tool according to claim 1, wherein the inductor layer is a copper layer deposited by means of a galvanic process.

6. The forming tool according to claim 1, wherein the temperature regulation canals are connected to a temperature regulation unit conveying a temperature regulation fluid and the inductor layer is connected to a current supply unit for operating the inductor, the temperature regulation unit and the current supply unit being connected to a control module for controlling both units.

7. The forming tool according to claim 6, wherein the second temperature regulation canals are connected to a second temperature regulation unit which is connected to the control module for controlling this temperature regulation unit.

8. The forming tool according to claim 1, wherein the forming tool is formed from tool steel.

9. The forming tool according to claim 1, wherein the dielectric first layer is formed from silicon oxide deposited from a Sol-Gel.

10. The forming tool according to claim 1, wherein the dielectric first dielectric layer has a thickness of only a few µm.

11. The forming tool according to claim 1, wherein the electrically conductive second layer has a thickness of only a few µm.

12. A forming tool, made from an electrically conductive metal with a forming contact surface comprising:

a first temperature regulation canal which is integrated in the tool at a closest distance from the contact surface and through which a fluid flows;

a second temperature regulation canal through which a fluid flows and which is arranged at a longer distance from the contact surface opposite the first temperature regulation canal; and an internal wall of the first temperature regulation canal comprising a dielectric first layer formed from sol-gel deposited silicon dioxide deposited on a wall of the first temperature regulation canal, an electrically conductive second layer formed from indium-tin-oxide deposited on the dielectric layer and a third layer made of galvanically deposited copper, the third layer being an inductor layer having a thickness of about 0.2 mm.

13. The forming tool according to claim 12, wherein the dielectric first layer has a thickness of only a few µm.

14. The forming tool according to claim 12, wherein the electrically conductive second layer has a thickness of only a few µm.

* * * * *